Inventors:
Richard W. Pecina
Henry M. Scislowicz
Frank C. Dayton, Jr.
By: Neil E. Hamilton
Atty.

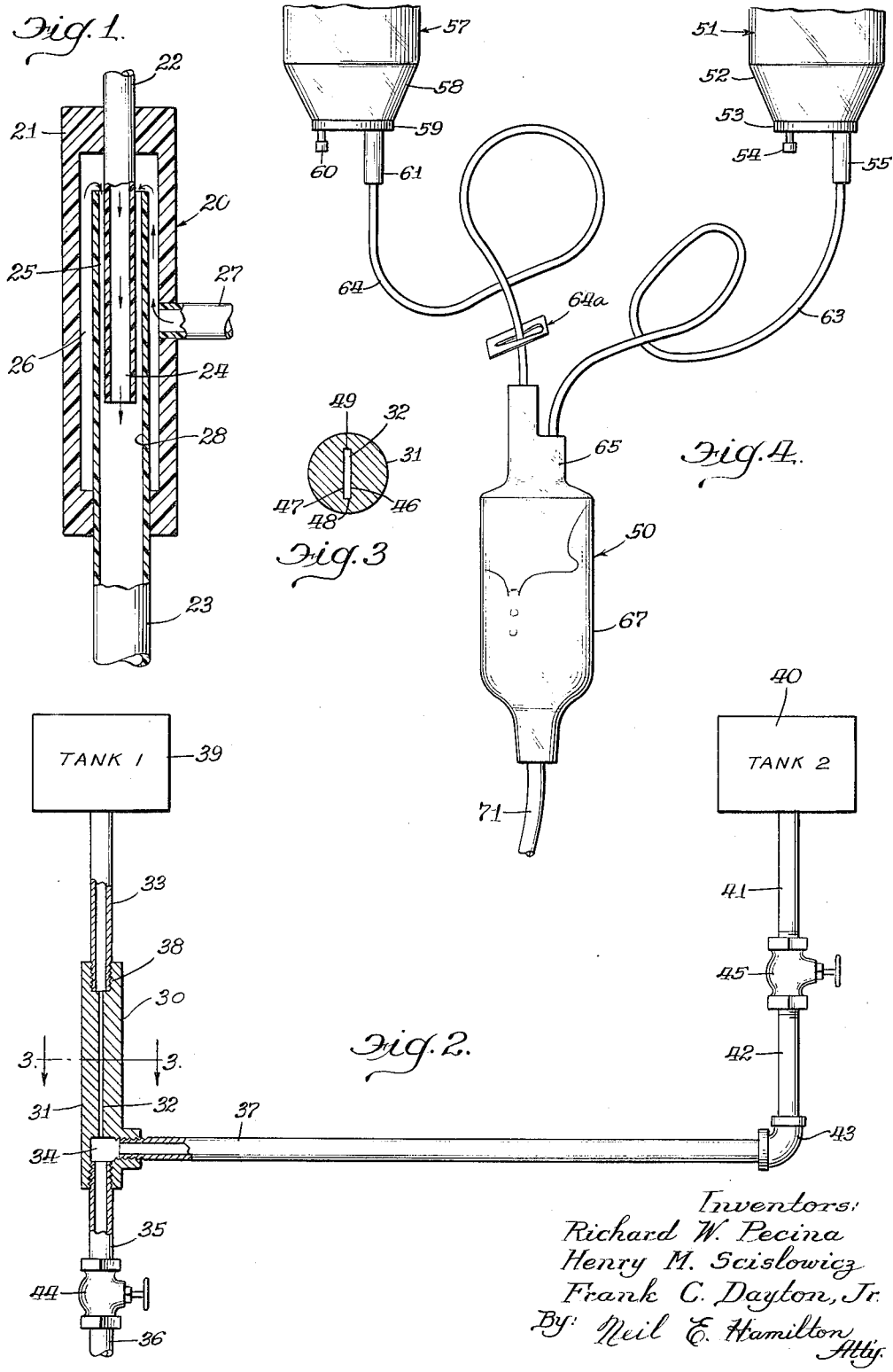

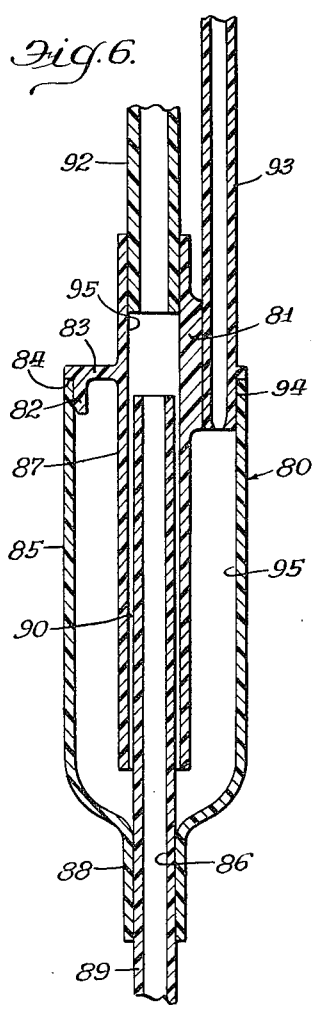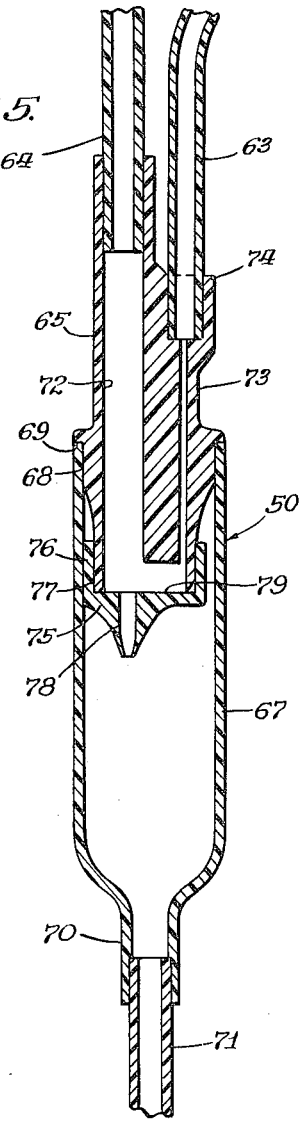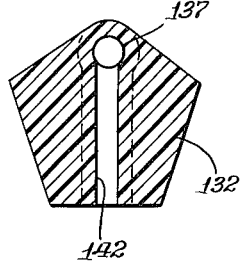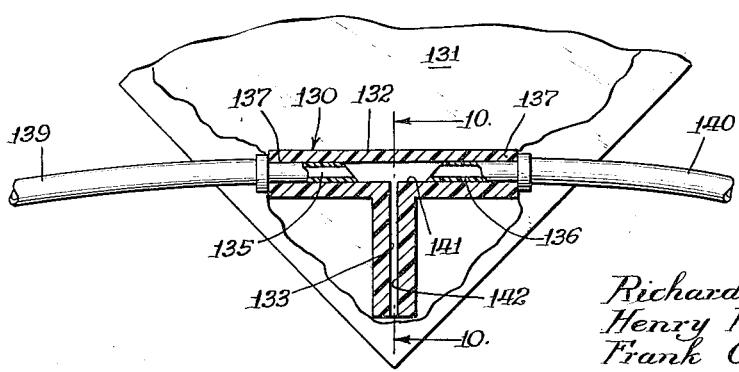

United States Patent Office 3,217,711
Patented Nov. 16, 1965

3,217,711
VALVE APPARATUS FOR SEQUENTIALLY ADMINISTERING PARENTERAL FLUID FROM SEPARATE SOURCES
Richard W. Pecina, Waukegan, Henry M. Scislowicz, Lake Bluff, and Frank C. Dayton, Jr., Chicago, Ill., assignors to Abbott Laboratories, North Chicago, Ill., a corporation of Illinois
Filed Aug. 1, 1963, Ser. No. 299,295
10 Claims. (Cl. 128—214)

This application is a continuation-in-part of application Serial Number 99,083, filed March 29, 1961, to the same inventors, now abandoned.

This invention relates to a means for controlling the flow of liquids in a closed system. More particularly, this invention relates to a valve-like means for sequentially permitting flow from two discrete sources to a common feed line.

There are many instances where it is desirable to have two or more sources of liquid flow through a common feed line. This is true in the therapeutic field where two or more intravenous solutions are administered to a recipient through a common feed line attached to a hypodermic needle. It is particularly desirable to be able to effect sequential flow from two independent sources of parenteral fluids to a hypodermic needle without the occurrence of any appreciable mixing of the two fluids. It is also true in other areas such as fuel burners where for various reasons two or more fuel tanks are connected by a common feed line to a burner. Another example is in the chemical or petroleum field. There it is often necessary in the reaction of chemicals or the blending of petroleum to employ a separate source for each material which is ultimately fed into a common receptacle. All of the foregoing procedures require some type of valving mechanism to control the flow of the liquid into the common feed line. In valving mechanisms generally available on the market today, the presence of moving parts is required. For example, there is the ball check valve, the float type valve, the common screw type valve, etc. It is obvious that many problems are encountered in such valving mechanisms because of the dependency on the moving of the parts.

A principal object of this invention is to provide a simple, efficient and inexpensive apparatus which will allow delivery of a liquid from one source of supply and then will automatically allow delivery of a second liquid through a common feed line without the movement of any parts being effected, and without the occurrence of any substantial mixing of the two liquids being supplied.

Other objects and advantages of this invention include: the provision of a simple apparatus having the functions of a valve but operating without the use of moving parts; an apparatus wherein a first liquid, while flowing therethrough, can withhold the flowage of a second liquid; a blending device having the ability to allow two liquids to intermingle at a predetermined rate without supervision; and a device which accomplishes all of the previously mentioned objects and advantages without adjustment for the densities, viscosities or rate of flow of the liquids.

The foregoing objects and other objects of the present invention will be readily appreciated by reference to the following detailed description when considered in conjunction with the accompanying drawings showing embodiments of the invention wherein:

FIGURE 1 is a view in vertical section of one embodiment of the present invention with arrows indicating the flow of the liquids therein;

FIGURE 2 is an elevational view, partially in section, of another embodiment of this invention shown diagrammatically in conjunction with separate sources of liquid supply;

FIGURE 3 is a view in horizontal section taken along lines 3—3 of FIGURE 2;

FIGURE 4 is an elevational view of two parenteral administration sets connected to still another embodiment of the present invention;

FIGURE 5 is a view in vertical section of the valving device and drip chamber of FIGURE 4;

FIGURE 6 is a view in vertical section illustrating a further embodiment for use in conjunction with the apparatus of FIGURE 4;

FIGURE 9 is a view like FIGURE 8 illustrating still another embodiment of this invention; and FIGURE 10 is a sectional view taken along line 10—10 of FIGURE 9.

Figure 7:
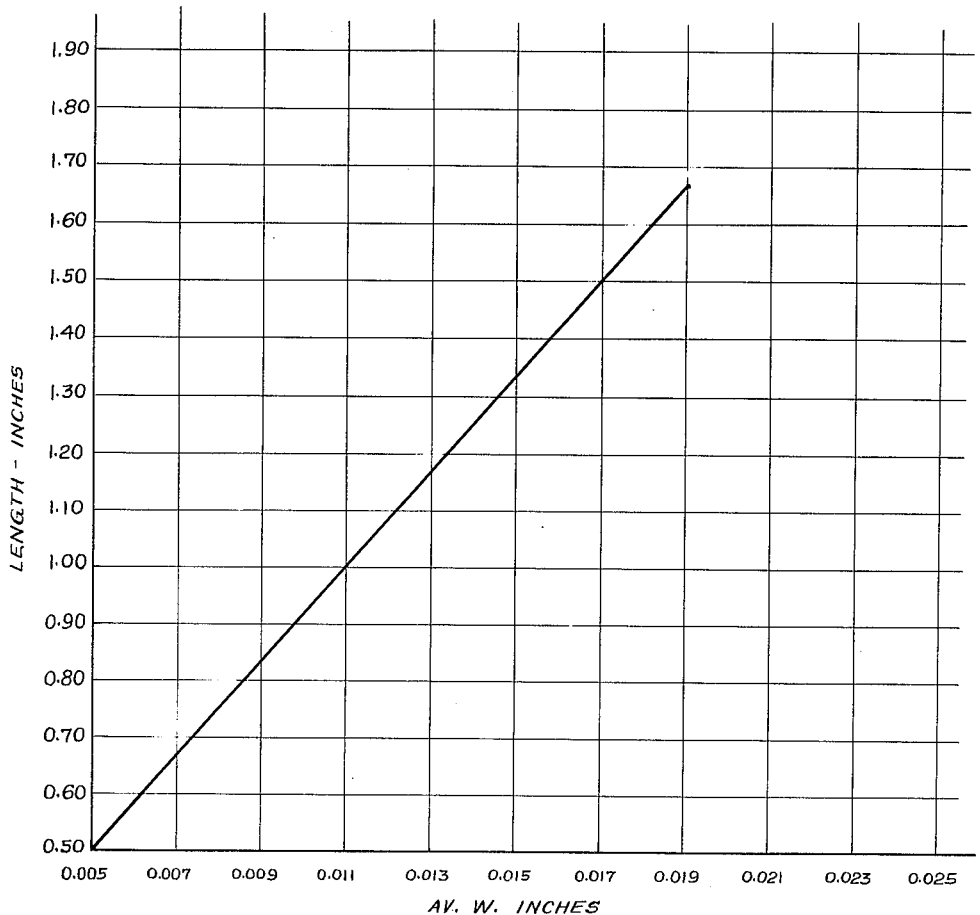
FIGURE 7 is a graph showing the range of dimensions of the novel apparatus of this invention.

Briefly stated, the device of this invention comprises a body section having a relatively large passageway extending therethrough and in communication with a discharge outlet. The body section also has a relatively small constricted channel in direct communication with the larger passageway. The larger passageway is attached to a first source of liquid and a second source of liquid communicates with the constricted channel. When the first liquid is permitted to flow through the large passageway it will block the flow of the second liquid which otherwise would be free to flow through the constricted channel. When the flow of the first liquid is stopped, the second liquid will flow through the constricted channel and out through the discharge outlet.

In the succeeding detailed description, the word "valve" is used in its broader sense to mean anything suggestive of a valve, especially in regulating, checking, or permitting the flow of something, as defined in Webster's New International Dictionary of the English Language, second edition, unabridged, 1957.

A preferred embodiment, generally indicated at 20, has a cylindrical, hollow body section 21 with two oppositely disposed inlet and outlet conduits 22 and 23, respectively, which are in fluid tight engagement with body section 21 and extend into the interior thereof.

Inlet conduit 22 provides a relatively large passageway 24 within body section 21. Passageway 24 communicates with a discharge passageway 28 in outlet conduit 23. The outside diameter of conduit 22 is smaller than the interior diameter of conduit 23 and telescopes axially a substantially distance into large diameter conduit 23. An axially aligned constricted channel 25 is thereby created between the outside of conduit 22 and the inside of conduit 23. Body section 21 also has a large compartment 26 formed between the outside of outlet conduit 23 and the inside of the body section. At the interior end of conduit 23, channel 25 communicates with compartment 26. Extending through the lateral wall of the body section 21 is a third conduit 27, the interior of which communicates with compartment 26. Body section 21, as well as conduits 22, 23 and 27 are formed of a rigid, plastic material such as styrene.

Inlet conduit 22 is connected to a first source of parenteral fluid, while lateral inlet conduit 27 is connected to a second source of parenteral fluid. If both fluids are permitted to freely flow into valve body 21, the flow of fluid from conduit 22 can control the flow of fluid from conduit 27. This result is obtained by virtue of the fact that the opposed walls of the constricted channel 25 are so close together that a substantial portion of the fluid in channel 25 comes in contact with the walls of conduit 22 and 28 and the frictional force of these walls upon the contiguous fluid particles is sufficient to greatly retard the flow of fluid from said second source through the constricted channel. This frictional force, when acting in combination with the back pressure of the first fluid near the outlet of passageway 24 which acts on the mouth of channel 25 is sufficient to substantially prevent any flow of the second fluid beyond the constricted channel 25 when there is a substantial flow of fluid through inlet conduit 22. When the first source of fluid is substantially exhausted, the back pressure at the mouth of channel 25 is insufficient to prevent flow in channel 25, since the frictional force of the walls defining channel 25, acting alone on the fluid therein, is insufficient to prevent flow through channel 25. Accordingly, when the first fluid is substantially exhausted, flow through channel 25 will commence and will continue until the second source of fluid is exhausted. This alternation of flow occurs automatically upon the substantial exhausting of the first source of fluid.

Another embodiment of the present invention, generally 30, is illustrated in FIGURE 2 and comprises a generally cylindrical, stainless steel body section 31 having a rectangular constricted channel 32. This is best illustrated in FIGURE 3. A threaded inlet pipe 33 communicates with channel 32 at one end and a large diameter passageway 34 communicates with channel 32 at the other end. A threaded discharge pipe 35 also communicates with passageway 34 at a point opposite channel 32. A second inlet, threaded pipe 37, communicates laterally with passageway 34 and at a right angle with respect to inlet and discharge pipe 33 and 35, respectively. A first tank 39 communicates with inlet pipe 33 and a second tank 40 communicates with inlet pipe 37 by means of extension pipes 41 and 42, valve 45 and elbow 43.

Embodiment 30 is best suited for the automatic mixing of two ingredients such as chemical reactants. For illustration purposes, it will be assumed that discharge pipes 35 and 37 lead to a suitable receptable (not shown) for both reactants. Valve 44 disposed between pipe 35 and extension portion 36 is turned on. A first chemical reactant is placed in tank 40 and a second reactant in tank 39. Valve 45 is opened and the reactant from tank 40 flows through passageway 34 and out through discharge pipe 35. At the same time, the reactant from tank 39 flows into channel 32. Because of the small width of channel 32 and also because of the back pressure caused by the flow of the reactant from tank 40 through passageway 34, the flow of the reactant from tank 39 is blocked and prevented from entering passageway 34. When the supply of the reactant in tank 40 is diminished or its flow interrupted by closing valve 45, the reactant in tank 39 will flow into channel 34 and out through discharge pipe 36.

Another embodiment, generally 50, of the present valving apparatus, is described in FIGURES 4 and 5 of the drawing. Valving apparatus 50 is shown in conjunction with a first standard venoclysis administration apparatus, generally 51, comprising a solution container 52 having a closure cap 53 with an air valve means 54 and a discharge outlet 55 associated therewith. A second standard venoclysis administration apparatus, generally 57, also is employed and includes a container 58 and a closure cap 59 with an air valve means 60 and a discharge outlet 61. Two lengths of flexible, plastic tubing 63 and 64 have one of the ends of each attached to discharge outlets 55 and 61, respectively. The other ends of the lengths are secured in a rigid, plastic body section 65. A flexible, plastic sight and drip chamber 67 (FIGURE 5) is secured to a straight wall portion 68 of body section 65 and abuts against shoulder 69 thereof. Drip chamber 67 has a reduced diameter section 70 into which is secured a length of flexible plastic tubing 71. A hypodermic needle (not shown) is attached to the unsecured end of tubing 71 for administering the parenteral liquids from containers 52 and 58.

Body section 65 is composed of a rigid, plastic material, preferably methacrylate and has a large diameter passageway 72 into which is attached tubing 64. A constricted channel 73 is disposed in body section 65 in a parallel manner in respect to passageway 72. Tubing 63 extends into an accommodating compartment 74 in body section 65 and communicates with channel 73. A rigid, plastic, drop-forming member 75 having a skirt 76 is attached to an extended wall portion 77 of body section 65 within the drip chamber 67. Drop-forming member 75 has a discharge passage 78 with a tapering portion for forming drops of the solution passing therethrough. A common chamber 79 is provided between channel 72 and passageway 73 by the placement of the drop forming member over the end of body section 65.

In operation, a first parenteral solution such as blood is provided in container 58 and a second parenteral liquid such as dextrose is provided in container 52. Both the dextrose solution and the blood are permitted to flow into body section 65 by means of tubing 64 and 63, respectively. The blood flows from tubing 64 into passageway 72, through passage 78 of drop-forming member 75, into sight chamber 67 and ultimately out through flexible tubing 71 to a recipient. Meanwhile, dextrose from tubing 63 has entered constricted channel 73. Because of the relatively small width of constricted channel 73 (as best seen in FIG. 5) and due to the back pressure generated by the flow of blood through passageway 72, the dextrose is prevented from entering common chamber 79. When the flow of blood through passageway 72 is interrupted for any reason, such as by the closing of clamp 64a, dextrose will automatically flow into chamber 79 through passage 78 and ultimately out through tubing 71, since the frictional force of the walls of channel 73 is per se insufficient to prevent flow through channel 73.

The valving device, generally 80, of FIGURE 6 is constructed to be used with the administration apparatus 51 and 57 of FIGURE 4. A rigid, methacrylate body section 81 has a lateral wall portion 82 and an end wall 83 forming a shoulder 84 for securing a cylindrical chamber or valve body member 85 thereto. A tubular passage way 87 extends from end wall 83 and into chamber 85 terminating a short distance from the reduced diameter portion 88 thereof. A rigid, plastic discharge tube 89, having an external diameter slightly smaller than the internal diameter of tubular passageway 87 telescopes into tubular member 87 terminating a short distance from a point where end wall 83 joins tubular passageway 87. Discharge tube 89 forms a discharge passageway 86 and a constricted channel 90 is formed between tubular member 87 and discharge tube 89. Tubular member 87 extends a short distance outwardly from end wall 83 of chamber member 85 to receive an end of flexible tubing 92. A second length of flexible plastic tubing 93 is accommodated within body section 81 by means of a channel 94. Tubing 93 communicates with compartment 95 formed within chamber member 85.

To operate valving device 80, flexible tubing 92 is connected to discharge outlet 61 of container 58 and tubing 93 is connected to discharge outlet 55 of container 52. The blood is permitted to flow through tubing 92 and into tubular passageway 87 where it will enter discharge passageway 86 and be conveyed to a recipient by means of a hypodermic needle (not shown) attached to discharge tube 89. Dextrose from container 52 is simultaneously permitted to flow through tubing 93 and into compartment 95 where it will enter constricted channel 90 and tend to flow through constricted channel 90. However, due to the relatively small width of the channel and the back pressure of the blood flowing into discharge tube 89 the flow of the dextrose will be blocked so that none of it will enter the discharge tube 89. When the flow of the blood is interrupted or it ceases, the dextrose will flow through passageway 90 and enter that portion of tubular passageway 87 between the ends of discharge tube 89 and tubing 92 whereafter it will flow out through discharge passageway 86.

Figure 8:
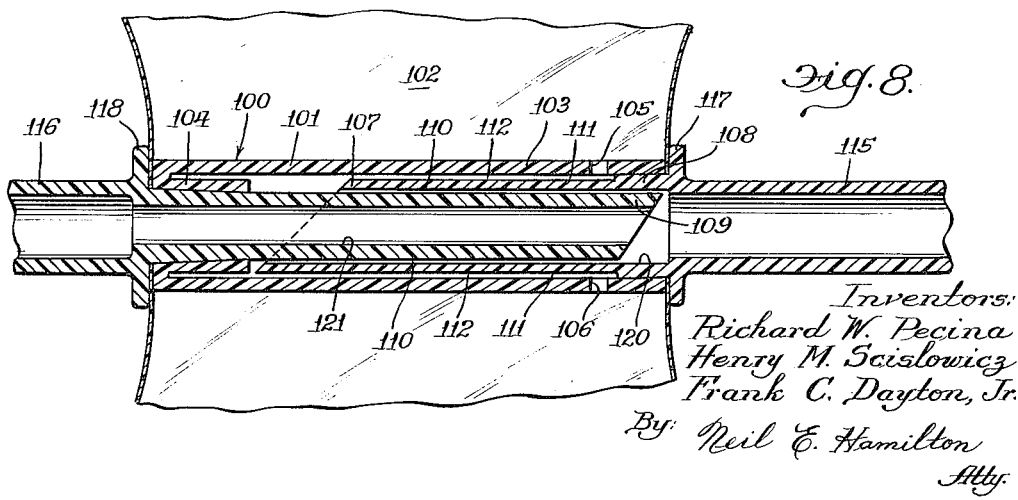
FIGURE 8 is a view in vertical section of yet another embodiment of the present invention adapted to operate within the confines of a flexible plastic container.

FIGURES 8 and 9 illustrate embodiments of this invention, having constricted or capillary channels which are adapted to operate within the confines of a flexible, plastic container.

Referring to FIGURE 8, valving device, generally 100 comprises a rigid, plastic valve body 101 which is of a tubular configuration and is placed inside a flexible plastic container 102. Valve body 101 is in this instance formed of a rigid, high density polyethylene. Valve body 101 has an external cylindrical wall portion 103 with a second internal wall portion 104 at one end thereof. Two oppositely disposed openings 105 and 106 are provided through wall 103. The internal diameter of wall portion 103 is of such dimension as to frictionally receive a rigid, plastic piercing pin or cannula 107 therein. Pin 107 has an annular shoulder 108 which frictionally engages the inner face of wall portion 103. A second rigid, plastic piercing pin or cannula 109 telescopes within pin 107 and frictionally engages wall portion 104. The internal diameter of pin 107 is slightly larger than the external diameter of pin 109 so that an axially aligned constricted channel 110 is formed between the two pins. Pin 107 has a reduced diameter section 111, and when it is inserted in valve body 101, a second axially aligned constricted channel 112, is formed between pin 107 and the inside of valve body 100.

Valving device 100 is employed by having one length of plastic tubing 115 communicating with pin 107 and a second length of tubing 116 communicating with pin 109. Flanges 117 and 118 are provided on pins 107 and 109, respectively, to provide a fluid tight connection between the pins and body section 101 with the wall of the container 102 between the flanges and the body section. Tubing 115 is connected to a discharge outlet of a container such as outlet 61 of container 58. Tubing 116 is attached to a hypodermic needle (not shown). The dextrose filling container 102, flows through openings 105 and 106 and into constricted passageways 112 and 110. The flow of dextrose into passageway 120 is prevented because of the small cross sectional dimension of passageways 112 and 110 and because of the back pressure caused by the simultaneous flow of a second liquid such as blood through tubing 115, channel 120 and into the discharge passage 121 within pin 109. Dextrose will automatically flow into channel 120 and passageway 121 when the flow of blood is stopped.

Another valving device, generally 130, is illustrated in FIGURE 9 for use within a plastic container 131. Valving device 130 has a substantially flat walled V-shaped valve body 132 composed of a rigid, polyethylene material. A T-shaped channel 133 is defined by valve body 132 with the crossarm of the T being substantially larger in width than is the leg thereof. Rigid plastic piercing pins or cannulae 135 and 136 are frictionally engaged in the cylindrical crossarm portion 137 of passageway 133. Pins 135 and 136 are connected to lengths of flexible, plastic tubing 139 and 140, respectively. Valving device 130 operates on the same principle as valving device 100. To illustrate, blood flows into tubing 140 through the tubular passageway 141, between pins 136 and 135 and out through tubing 139. The dextrose in container 131 tends to flow through the narrow constricted channel 142 forming the leg of passageway 133, which is in open communication with the interior of container 131. However, because of the narrow width of constricted channel 142, which has a rectangular cross section, the flow of dextrose is impeded. This frictional resistance prevents the flow of dextrose into either tubing 140 or 139. The frictional resistance in passageway 142 also prevents the blood from entering the container 131. When the flow of blood is stopped, the dextrose will flow from container 131 through passageway 142 and into tubing 139.

It will be noted that devices 50, 80, 100 and 130 have been described for delivery of parenteral liquids to a recipient. In these instances, the flow of liquid through the respective body sections is extremely slow so that only a drop of liquid at a time emerges from the hypodermic needle. In body sections 81 and 101, for example, wherein the flow of liquid through constricted channels 90 and 110, respectively, is directly opposite to the flow of liquid from inlet tubing 92 and 115, respectively, a back pressure is created which helps to prevent flowage through the respective constricted passageways. On the other hand, in body section 132, the flow through constricted channel 142 is at right angles to the flow from inlet tubing 140. However, because of the slow flowage rate, none of the liquid in the constricted channel is pulled into the larger passageway.

The term "constricted" has been used to describe the channels having a relatively small cross sectional dimension and employed to withhold one of the liquids. The constricted channels are slot-like in construction and it must be pointed out that the critical dimensions of the constricted passageway to function in the manner herein described are in the width (i.e. the narrowest cross sectional dimension) and the length of the passageway. These dimensions are best understood by reference to the drawings.

For example, in the valving system of FIGURE 1, the width is the distance between the inner surface of large diameter outlet conduit 23 and the outer surface of small diameter of inlet conduit 22. The length of passageway 25 in the device 20 would be the distance from the point at which small diameter inlet conduit 22 enters large diameter outlet conduit 23 to the point where it terminates in conduit 23. The same is true of passageway 90, of valving device 80, and of passageways 110 and 112 of device 100 except in the latter device the combined length of both passageways must be taken into consideration.

In FIGURES 2, 5, and 9, the constricted passageways are shown in unitary body sections. The width of these passageways refers to the narrowest dimension (as viewed in a cross section normal to the length of the passageway) rather than the largest, if the two are unequal. For example, in FIGURE 3 the width of passageway 32 is the distance between sides 46 and 47 rather than the distance from walls 48 and 49. The length of passageway 32 would be the distance from the enlarged threaded opening 38 for receiving pipe 33 to the channel 34. These dimensions would apply to the corresponding parts of passageways 73 and 142 of FIGURES 5 and 9. For example, the width of passageway 142 is seen in FIGURE 9 rather than in FIGURE 10.

A graph showing the relationship between the width and length of the constricted passageways is described in FIGURE 7. The graph is meant to illustrate the desirable range of dimensions for the width and length of the constricted passageway. It has been found that the smallest dimensions for both the width and length is about .005″ and about .5″, respectively, and the largest dimensions are about .019″ and about 1.66″, respectively. The equation for the line shown in FIG. 7, is $$Y = \frac{250}{3}X + \frac{1}{12}$$

where Y is the ordinate and represents the length of the passageway, and X is the abscissa and represents the width of the passageway.

If desired, the valving system of the present invention can be employed as a mixing apparatus by intentionally forming the constricted passageway so that some liquid is allowed to flow therethrough while the second liquid is passing through the larger passageway. This provides a constant intermingling of the two liquids with the amount of intermixing depending upon the width and length of the constricted passageway.

While specific body sections of the present embodiments have been described as being composed of methacrylate, polyethylene or styrene material, it should be understood that these materials can be interchanged and that other rigid and semi-rigid plastic materials such as the various acrylates or vinyl plastic can also be employed. In the valving device composed of plastic material, the parts can be solvent or heat sealed together depending upon the compatability of the materials. As regards body section 31 which is described as being composed of stainless steel, it should be understood that other metals such as aluminum and cast iron could also be employed depending upon the type of liquid to be passed through the valve. If desired, the parts composing the valving mechanism of devices 20, 50, 80, 100 and 130 could be composed of metal as well as plastic.

Others may readily adapt the invention for use under various conditions of service, by employing one or more of the novel features disclosed or equivalents thereof. As at present advised, with respect to the apparent scope of our invention, we desired to claim the following subject matter.

What is claimed is:

1. In an apparatus for parenteral administration of the type comprising two discrete sources of parenteral fluid and a hypodermic needle connected to said sources of fluid through a valve which permits sequential flow from said sources of fluid to said needle, the improvement wherein said valve comprises a valve body, a passageway defined by said valve body and adapted to be connected at one end to one of said sources of fluid and at the other end to said hypodermic needle and a constricted channel defined by said valve body having one end adapted to be connected to the other of said sources of fluid, said channel communicating with said passageway at a point spaced from said one end, the length and width of said constricted channel between said one end thereof and said point being substantially defined by the equation $$Y=\frac{250}{3}X+\frac{1}{12}$$

between the points 0.005, 0.50 and 0.019, 1.667, wherein Y represents the length and X represents the width of said channel.

2. A valve structure comprising a valve body, a passageway defined by said valve body, said passageway having a first end adapted to communicate with a first source of fluid and a second end operative as a discharge outlet, a restricted channel defined by said valve body and having an inlet end adapted to communicate with a second source of fluid and an outlet end in communication with said passageway at a point spaced from said inlet end, said channel having dimensions of length and width defined substantially by the equation $$Y=\frac{250}{3}X+\frac{1}{12}$$

between the points 0.005, 0.50 and 0.019, 1.667 wherein Y represents the length and X represents the width of said channel, said passageway having a substantially greater width than said channel, whereby upon communication of said passageway and said channel with respective sources of fluid, fluid flow from said channel into said passageway is substantially blocked by fluid flow from the inlet of said passageway, and substantial cessation of fluid flow at the inlet of said passageway enables fluid flow from said channel into said passageway to commence.

3. In an apparatus for parenteral administration comprising a first source of parenteral fluid and a second source of parenteral fluid connected through a valve means to a hypodermic needle, the improvement wherein said valve means comprises a valve body, a passageway defined by said valve body and having an inlet adapted to be communicated with said first source of fluid and a discharge outlet, and a constricted channel defined by said valve body having an inlet adapted to be communicated with said second source of fluid and an outlet in fluid communication with said passageway, said channel having a length and width in the relationship substantially defined by the equation $$Y=\frac{250}{3}X+\frac{1}{12}$$

between the points 0.005, 0.50 and 0.019, 1.667 wherein Y represents the length and X represents the average width of said channel.

4. A device as set forth in claim 3 wherein said channel has a rectangular cross-section and said passageway is substantially greater in size than the smallest dimension of said channel.

5. An apparatus for parenteral administration comprising a first container for parenteral fluid, and a second pierceable container for parenteral fluid communicating through a valve means to a hypodermic needle, the improvement wherein said valve means comprises a valve body adapted to be located in said second container, a passageway defined by said valve body having a first end adapted to be communicated with said first container and a second end adapted to be communicated with said hypodermic needle, and a constricted channel defined by said valve body having an inlet adapted to communicate with the contents of said second container and an outlet in communication with said passageway at a point between the ends thereof, the length and width of said channel having the relationship substantially defined by the equation $$Y=\frac{250}{3}X+\frac{1}{12}$$

between the points 0.005, 0.50 and 0.019, 1.667 wherein Y represents the length and X represents the average width of said channel.

6. A valve structure comprising a valve body, said valve body defining a passageway therein, said passageway having a first end adapted to be communicated with a first source of fluid and a second end operative as a discharge outlet, said valve body defining a restricted channel of rectangular cross section with an inlet end adapted to be communicated with a second source of fluid and an outlet end opening into said passageway at a point spaced between the ends of said passageway, said channel having dimensions of length and width substantially as defined by the equation $$Y=\frac{250}{3}X+\frac{1}{12}$$

between the points 0.005, 0.50 and 0.019, 1.667 wherein Y represents the length and X represents the average width of said channel.

7. In an apparatus for parenteral administration of the type comprising two discrete sources of parenteral fluid and a hypodermic needle connected to said sources of fluid through valve means which permits sequential flow from said sources of fluid to said needle, the improvement wherein said valve means comprises a valve body, said valve body defining a passageway adapted to be connected at one end to one of said sources of fluid and at the other end to said hypodermic needle, said valve body defining a constricted channel normal to said passageway and having an inlet end adapted to be connected to the other of said sources of fluid and an outlet end communicating with said passageway at a point spaced between the ends of said passageway, said channel having a length and width substantially defined by the equation $$Y = \frac{250}{3}X + \frac{1}{12}$$

between the points 0.005, 0.50 and 0.019, 1.667 wherein Y represents the length and X represents the width of said channel, said passageway having a substantially greater width than said channel.

8. An apparatus for parenteral administration comprising a first container for parenteral fluid and a second pierceable container for parenteral fluid communicating through a valve means with a hypodermic needle, the improvement wherein said valve means comprises a valve body adapted to be located in said second container, a passageway defined by said valve body having a first end adapted to be communicated with said first container by a cannula piercing said second container and inserted in said first end and a second end adapted to be communicated with said hypodermic needle by a cannula piercing said second container and inserted in said second end, and a constricted channel defined by said valve body having an inlet adapted to communicate with the contents of said second container and an outlet in communication with said passageway at a point between the ends thereof, the length and width of said channel substantially satisfying the equation $$Y = \frac{250}{3}X + \frac{1}{12}$$

between the points 0.005, 0.50 and 0.019, 1.667 wherein Y represents the length and X represents the width of said channel.

9. A valve structure comprising a valve body, a first passageway defined by said valve body, said first passageway having a first end adapted to be connected to a first source of fluid and a second end operative as a discharge outlet, a constricted channel defined by said valve body having an inlet end adapted to be connected to a second source of fluid and an outlet end in communication with said first passageway at a point intermediate the ends thereof, said restricted passageway having dimensions of length and width substantially satisfying the equation $$Y = \frac{250}{3}X + \frac{1}{12}$$

between the points 0.005, 0.50 and 0.019, 1.667 wherein Y represents the length and X represents the average width of said channel, said first passageway having a substantially greater cross-sectional area than said second passageway whereby when both of said passageways are in communication with respective sources of fluid, fluid flow from said restricted passageway into said first passageway is substantially blocked by fluid flow from the inlet of said first passageway, and when fluid flow at the inlet of said first passageway has substantially ceased, fluid flow from said restricted passageway into said first passageway is obtained.

10. In an apparatus for parenteral administration comprising a first source of parenteral fluid and a second source of parenteral fluid connected through a valve means to a hypodermic needle, the improvement wherein said valve means comprises a valve body, an enclosed chamber defined by said valve body, a first cannula adapted to be connected to said first fluid source and extending into said chamber, a second cannula extending into said chamber in opposed, telescoping, concentric relation with respect to said first tube, and adapted to communicate with said hypodermic needle means adapted to communicate said chamber with said second source of fluid, the length of overlap of said first cannula and said second cannula and the spacing therebetween substantially satisfying the equation $$Y = \frac{250}{3}X + \frac{1}{12}$$

between the points 0.005, 0.50 and 0.019, 1.667 wherein Y represents the length and X represents the average width of said channel.

References Cited by the Examiner

UNITED STATES PATENTS

| | | | |
|---|---|---|---|
| 515,210 | 2/1894 | Graves | 137—605 X |
| 2,308,757 | 1/1943 | Hulsberg | 285—96 |
| 2,962,193 | 11/1960 | Totten | 222—145 |

RICHARD A. GAUDET, *Primary Examiner.*